(12) United States Patent
Ting et al.

(10) Patent No.: US 11,849,723 B2
(45) Date of Patent: Dec. 26, 2023

(54) DISPERSION AND METHOD AND COMPOSITION FOR PREPARING THE SAME

(71) Applicant: Far Eastern New Century Corporation, Taipei (TW)

(72) Inventors: Li-Tzu Ting, Taipei (TW); Yu-Chun Wu, Taipei (TW); Wei-Che Hung, Taipei (TW)

(73) Assignee: Far Eastern New Century Corporation, Taipei (TW)

( * ) Notice: Subject to any disclaimer, the term of this patent is extended or adjusted under 35 U.S.C. 154(b) by 278 days.

(21) Appl. No.: 17/147,300

(22) Filed: Jan. 12, 2021

(65) Prior Publication Data
US 2021/0368785 A1 Dec. 2, 2021

(30) Foreign Application Priority Data
May 26, 2020 (TW) .................. 109117457

(51) Int. Cl.
| | | |
|---|---|---|
| *A01N 25/04* | (2006.01) | |
| *C11D 3/48* | (2006.01) | |
| *A01N 55/02* | (2006.01) | |
| *C11D 3/12* | (2006.01) | |
| *C11D 1/74* | (2006.01) | |

(52) U.S. Cl.
CPC .............. *A01N 25/04* (2013.01); *A01N 55/02* (2013.01); *C11D 1/74* (2013.01); *C11D 3/1213* (2013.01); *C11D 3/48* (2013.01)

(58) Field of Classification Search
CPC .......... A01N 25/04; A01N 55/02; C11D 1/74; C11D 3/1213; C11D 3/48
See application file for complete search history.

(56) References Cited

U.S. PATENT DOCUMENTS

| | | | | |
|---|---|---|---|---|
| 5,434,239 A | * | 7/1995 | Bhatia .................... | C08G 63/78 528/274 |
| 10,472,464 B2 | * | 11/2019 | Chien ..................... | C08G 63/85 |

OTHER PUBLICATIONS

J-T. Du, et al. "ZnO nanodispersion as pseudohomogeneous catalyst for alcoholysis of polyethylene terephthalate," Chemical Engineering Science 220, 2020, 1-10. (Year: 2020).*

* cited by examiner

*Primary Examiner* — Michael P Cohen
(74) *Attorney, Agent, or Firm* — Christensen O'Connor Johnson Kindess PLLC (57) ABSTRACT

A dispersion includes a zinc oxide component, and an aromatic polyol which is represented by Formula (I) and which has terminal hydroxyl groups that form chelating bonds with zinc atoms of the zinc oxide component, (I)

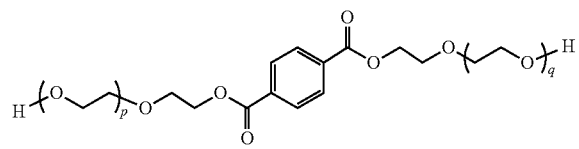

wherein p and q are independently integers ranging from 1 to 40. A method for preparing the dispersion includes heating a composition including the aromatic polyol and a zinc-containing salt, so that the zinc-containing salt undergoes nucleophilic reaction and condensation reaction to form the zinc oxide component. A composition for preparing the dispersion is also disclosed.

20 Claims, 5 Drawing Sheets

DISPERSION AND METHOD AND COMPOSITION FOR PREPARING THE SAME

CROSS-REFERENCE TO RELATED APPLICATION

This application claims priority of Taiwanese Invention Patent Application No. 109117457, filed on May 26, 2020.

FIELD

This disclosure relates to a dispersion, and a method and a composition for preparing the same, and more particularly to a dispersion having a satisfactory dispersion stability, and a method and a composition for preparing the same.

BACKGROUND

Zinc oxide is known as its antimicrobial effects. It is noted that zinc oxide is capable of releasing $Zn^{2+}$ ions to bond to negative-charged substances (e.g., proteins carrying negative charges or anions) on the surfaces of bacteria, adversely affecting bacterial cell integrity, thereby achieving physical sterilization.

Generally, zinc oxide is used in powdered form, which might have a poor dispersibility and might be harmful if inhaled by a human subject during operation.

In order to solve the abovementioned problems, a conventional approach is to prepare a zinc oxide dispersion, in which zinc oxide is dispersed in polyols such as polyethylene glycol 400 (PEG400), polyethylene glycol 600 (PEG600), polypropylene glycol 450 (PPG450), etc., so as to provide convenience and to ensure safety during use. However, zinc oxide cannot disperse stably and is prone to agglomeration and precipitation in the abovementioned polyols, which might adversely affect the use of the zinc oxide dispersion.

SUMMARY

Therefore, a first object of the disclosure is to provide a dispersion that can alleviate or eliminate at least one of the drawbacks of the prior art. A second object of the disclosure is to provide a method for preparing a dispersion that can alleviate or eliminate at least one of the drawbacks of the prior art. A third object of the disclosure is to provide a composition for preparing a dispersion that can alleviate or eliminate at least one of the drawbacks of the prior art.

According to a first aspect of the disclosure, the dispersion includes a zinc oxide component, and an aromatic polyol which is represented by Formula (I), and which has terminal hydroxyl groups that form chelating bonds with zinc atoms of the zinc oxide component, (I)

wherein p and q are independently integers ranging from 1 to 40.

According to a second aspect of the disclosure, the method for preparing a dispersion includes the steps of:

heating a composition including a zinc-containing salt, and an aromatic polyol which is represented by Formula (I), and which has terminal hydroxyl groups, so that the zinc-containing salt undergoes a nucleophilic reaction to form a zinc intermediate product including one of a zinc-containing hydroxide and a zinc-containing alkoxide, and then the zinc intermediate product undergoes a condensation reaction to form a zinc oxide component, and the terminal hydroxyl groups of the aromatic polyol form chelating bonds with zinc atoms of the zinc oxide component, thereby obtaining the dispersion, (I)

wherein p and q are independently integers ranging from 1 to 40.

According to a third aspect of the disclosure, the composition for preparing a dispersion includes a zinc-containing salt and an aromatic polyol. The zinc-containing salt is capable of forming a zinc intermediate product including one of a zinc-containing hydroxide and a zinc-containing alkoxide through a nucleophilic reaction, and forming a zinc oxide component through a condensation reaction of the zinc intermediate product under heating. The aromatic polyol is represented by Formula (I), and has terminal hydroxyl groups adapted for forming chelating bonds with zinc atoms of the zinc oxide component, (I)

wherein p and q are independently integers ranging from 1 to 40.

BRIEF DESCRIPTION OF THE DRAWINGS

Other features and advantages of the disclosure will become apparent in the following detailed description of the embodiment (s) with reference to the accompanying drawings, in which.

DETAILED DESCRIPTION

For the purpose of this specification, it will be clearly understood that the word "comprising" means "including but not limited to", and that the word "comprises" has a corresponding meaning.

Unless otherwise defined, all technical and scientific terms used herein have the meaning commonly understood by a person skilled in the art to which this disclosure belongs. One skilled in the art will recognize many methods and materials similar or equivalent to those described herein, which could be used in the practice of this disclosure. Indeed, this disclosure is in no way limited to the methods and materials described. For clarity, the following definitions are used herein.

According to the disclosure, a dispersion includes a zinc oxide component and an aromatic polyol which is represented by Formula (I), and which has terminal hydroxyl groups that form chelating bonds with zinc atoms of the zinc oxide component,

(I)

wherein p and q are independently integers ranging from to 40. In certain embodiments, p and q are independently integers ranging from 1 to 30. In other embodiments, p and q are independently integers ranging from 1 to 20. In yet other embodiments, p and q are independently integers ranging from 1 to 10.

The structure of the zinc oxide component (e.g., the arrangement of zinc atoms and oxygen atoms) is not limited specifically. In certain embodiments, the zinc oxide component includes amorphous zinc oxide. In order to provide the dispersion with a satisfactory fluidity and transparency, the zinc oxide component may be present in an amount ranging from 1 wt % to 30 wt % based on a total weight of the dispersion. In certain embodiments, the zinc oxide component is present in an amount ranging from 1 wt % to 20 wt % based on the total weight of the dispersion.

In certain embodiments, the aromatic polyol has a viscosity at 30° C. that ranges from 800 cP to 1500 cP, so as to obtain a dispersion which is easy to operate and also has a good dispersibility. In certain embodiments, the viscosity of the aromatic polyol at 30° C. ranges from 900 cP to 1200 cP.

In certain embodiments, the aromatic polyol represented by Formula (I) includes a terephthalic acid (hereinafter abbreviated as TPA) moiety [i.e., represented by a formula of

], which is present in the aromatic polyol in an amount ranging from 5 wt % to 50 wt % based on a total weight of the aromatic polyol. In certain embodiments, the TPA moiety is present in an amount ranging from 15 wt % to 35 wt % based on the total weight of the aromatic polyol.

The aromatic polyol represented by Formula (I) may be prepared by any process well-known in the art, for example, but is not limited to, by reacting ethylene oxide (hereinafter abbreviated as EO) with bis(2-hydroxyethyl) terephthalate (hereinafter abbreviated as BHET, which may be made by reacting TPA with EO). In certain embodiments, EO and BHET are reacted in a molar ratio of not smaller than 4:1, so as to obtain the aromatic polyol having an improved water solubility.

The aromatic polyol represented by Formula (I) having hydroxyl groups exhibits an excellent reactivity, and thus may serve as a reactive agent in subsequent applications. For example, when the dispersion is intended to be made into a polyurethane product, the aromatic polyol in the dispersion may serve as an alcohol, and the hydroxyl groups in the aromatic polyol may be directly reacted with a curing agent (e.g., having isocyanate groups), and therefore other additional alcohols may not be required during the preparation process of the polyurethane product. In addition, since the aromatic polyol has a relatively low viscosity, additional viscosity-reducing agents are not required, thereby lowering a production cost of the dispersion. Furthermore, the terminal hydroxyl groups of the aromatic polyol is capable of forming chelating bonds with zinc atoms of the zinc oxide component, while a phenyl group of the aromatic polyol can exhibit steric effect to repulse molecules of the zinc oxide component from one another, so as to effectively avoid agglomeration and precipitation of the zinc oxide component in the dispersion. As such, the use of the aromatic polyol represented by Formula (I) may simplify the process for preparing the dispersion and may lower a production cost thereof. The dispersion of this disclosure exhibits good dispersibility and stability, even under a relatively high temperature, and is suitable for use in the preparation of various products, such as a biomedical product (e.g, antimicrobial textile), a coating product (e.g, antimicrobial coating), and a leather product (e.g., antimicrobial artificial leather).

According to the disclosure, a method for preparing the dispersion may include heating a composition, which includes the aromatic polyol represented by Formula (I) as mentioned above and a zinc-containing salt.

During the heating process, the zinc-containing salt undergoes a nucleophilic reaction to form a zinc intermediate product which may include a zinc-containing hydroxide or a zinc-containing alkoxide. Then, the zinc intermediate product undergoes a condensation reaction to form a zinc oxide component, and the terminal hydroxyl groups of the aromatic polyol form chelating bonds with the zinc atoms of the zinc oxide component, thereby obtaining the dispersion. As such, molecules of the zinc oxide component mutually repulse one another due to a steric effect of the phenyl group of the aromatic polyol chelated thereto, thereby preventing agglomeration and precipitation of the zinc oxide component in the dispersion.

The zinc-containing salt is not particularly limited as long as it is capable of forming the zinc intermediate product including the zinc-containing hydroxide and the zinc-containing alkoxide through the nucleophilic reaction, and forming the zinc oxide component through the condensation reaction of the zinc intermediate product under heating. Examples of the zinc-containing salt suitable for use in this disclosure may include, but are not limited to, an acidic zinc salt, a zinc alkoxide, a zinc chloride, a zinc alkylate, a sulfur-containing zinc salt, zinc(II) acetylacetonate, and combinations thereof. Examples of the acidic zinc salt may include, but are not limited to, a carboxylic acid zinc salt, zinc nitrate, zinc chlorate, zinc perchlorate, and combinations thereof. Examples of the carboxylic acid zinc salt may include, but are not limited to, zinc acetate dihydrate [Zn(OAc)$_2$.2H$_2$O], zinc oxalate, and the combination thereof. Examples of the zinc alkoxide may include, but are not limited to, zinc dimethoxide (C$_2$H$_6$O$_2$Zn), zinc diethoxide (C$_4$H$_{12}$O$_2$Zn), and the combination thereof. Examples of the zinc alkylate may include, but are not limited to, dimethylzinc [Zn(CH$_3$)$_2$], diethylzinc [Zn(C$_2$H$_5$)$_2$], and the combination thereof. Examples of the sulfur-containing zinc salt may include, but are not limited to, zinc sulfur (ZnS), zinc sulfate (ZnSO$_4$), zinc sulfonate, and combinations thereof.

In certain embodiments, the zinc-containing salt is selected from the group consisting of zinc acetate dihydrate, zinc oxalate, zinc nitrate, zinc chloride, the zinc alkoxide, zinc chlorate, zinc perchlorate, zinc (II) acetylacetonate, and combinations thereof. In an exemplary embodiment, the zinc-containing salt is zinc acetate dihydrate.

The zinc-containing salt may be present in an amount ranging from 15 wt % to 98 wt % based on a total weight of the composition. In certain embodiments, the zinc-containing salt is present in an amount ranging from 15 wt % to 40 wt % based on the total weight of the composition.

It is noted that the zinc-containing salt is soluble in water. Thus, in certain embodiments, the composition further includes water, so as to assist the dissolution of the zinc-containing salt in the aromatic polyol. However, too much water may increase the intensity of the nucleophilic reaction, which may result in production of a large amount of the zinc intermediate product within a short time period, and the thus formed zinc oxide component may have a relatively large particle size and may be prone to precipitation. Therefore, the method for preparing the dispersion further includes a step of reducing water content of the composition by, e.g., heating at a temperature of not greater than 100° C. before the nucleophilic reaction. In certain embodiments, the amount of water in the composition is reduced to within a certain range, e.g., not greater than 1 wt %, based on a total weight of the composition.

During the nucleophilic reaction, the zinc-containing salt is transformed into one of the zinc-containing hydroxide and the zinc-containing alkoxide. An example of the zinc-containing hydroxide may include, but is not limited to, zinc hydroxide. Examples of the zinc-containing alkoxide may include, but are not limited to, zinc dimethoxide and zinc diethoxide.

To be specific, when the zinc-containing salt is carboxylic acid zinc salt, the carboxyl group in the carboxylic acid zinc salt is transformed into a hydroxyl group or an alkyloxy group by the nucleophilic reaction. When the zinc-containing salt is zinc chloride, the chloro group in the zinc chloride is transformed into a hydroxyl group or an alkyloxy group by the nucleophilic reaction. When the zinc-containing salt is zinc acetylacetonate, the acetylacetonyl group in the zinc acetylacetonate is transformed into a hydroxyl group or an alkyloxy group by the nucleophilic reaction.

The nucleophilic reaction may include, but is not limited to, a substitution reaction, an alcoholysis reaction, and a hydrolysis reaction. The nucleophilic reaction may be conducted in the presence of a reactive agent. For example, when the reactive agent is, e.g., a nucleophile (e.g., water), the nucleophilic reaction is, e.g., a hydrolysis reaction. When the reactive agent is, e.g., an alcoholic reactive agent (e.g., a hydrocarbon-alcohol), the nucleophilic reaction is an alcoholysis reaction. Examples of the hydrocarbon-alcohol may include, but are not limited to, an alkyl alcohol and an alkenyl alcohol (i.e., alkenol). When the reactive agent is, e.g., sodium hydroxide, the nucleophilic reaction is a substitution reaction. In certain embodiments, the zinc-containing salt is carboxylic acid zinc salt or zinc alkoxide, and the reactive agent is water. In other embodiments, the zinc-containing salt is zinc acetylacetonate, and the reactive agent is an alkyl alcohol. In still other embodiments, the zinc-containing salt is zinc chloride, and the reactive agent is sodium hydroxide. In certain embodiments, the nucleophilic reaction is a hydrolysis reaction.

The condensation reaction transforms the zinc intermediate product into the zinc oxide component. In certain embodiments, the nucleophilic reaction and the condensation reaction can be performed at the same time. In other embodiments, the nucleophilic reaction is performed before the condensation reaction.

In certain embodiments, the nucleophilic reaction is implemented at a first temperature, and the condensation reaction is implemented at a second temperature higher than the first temperature. In certain embodiments, the first temperature is higher than 100° C. and lower than 130° C., and the second temperature ranges from 130° C. to 150° C.

The disclosure will be further described by way of the following examples. However, it should be understood that the following examples are solely intended for the purpose of illustration and should not be construed as limiting the disclosure in practice.

EXAMPLES

Preparation of BHET 264.3 g (1.59 mol) of TPA, 2.9 g of sodium carbonate, and 158.5 g of water were added into a 1 L stainless steel reactor. The contents in the reactor were stirred and heated to a temperature of 120° C., and then 245.2 g (5.57 mol) of EO was gradually added into the reactor at a flow rate of 1 mL/min and the reactor was kept under the temperature of 120° C. and a pressure of not greater than 7.0 kgf/cm$^2$ for 15 minutes. Next, the reactor was cooled to a temperature of 110° C., and then water was removed using reduced pressure distillation. Finally, the reactor was cooled to room temperature so as to obtain BHET.

Preparation of Aromatic Polyol Represented by Formula (I)

Preparative Example 1

300 g (1.18 mol, 100 parts by weight) of BHET as prepared above and 0.04298 g (100 parts per million) of potassium hydroxide (KOH) were added into a reaction tank and heated to a temperature of 130° C. under a pressure of 9.0 kgf/cm$^2$. After the temperature of the reaction tank reached 130° C. and BHET was melted completely, 129.8 g (2.95 mol, 43.3 parts by weight) of EO was gradually added into the reaction tank at a flow rate of 1 mL/min. Next, the contents in the reaction tank were mixed and reacted at a rotation speed of 500 rounds per minute (rpm) for 0.5 hour to obtain the aromatic polyol of Preparative Example 1 (Hereinafter Abbreviated as PHB2.5)

Preparative Examples 2 to 6

The procedures for preparing the aromatic polyols of Preparative Examples 2 to 6 were similar to those for preparing the aromatic polyol of Preparative Example 1, except that the amount of EO added into the reaction tank for each of Preparative Examples 2 to 6 was varied as listed in Table 1, and the thus obtained aromatic polyols of Preparative Examples 2 to 6 were abbreviated as PHB6, PHB10, PHB20, PHB30, and PHB40, respectively.

Evaluations of the Aromatic Polyol Represented by Formula (I):

1. State of Matter Under Room Temperature

The aromatic polyol of each of Preparative Examples 1 to 6 was observed for a state of matter thereof under room temperature. The results are presented in Table 1 below.

2. Viscosity (cP)

The viscosity of the aromatic polyol of each of Preparative Examples 1 to 6 was measured with a digital viscometer (Manufacturer: Brookfield; Model: DV-E) under a temperature of 30° C. The results are presented in Table 1 below.

3. Molecular Weight

The molecular weight of the aromatic polyol of each of Preparative Examples 1 to 6 was determined using a mass spectrometer (Manufacturer: Waters Corporation; Model: Xevo TQ-GC). The results are presented in Table 1 below.

4. Amount of TPA Moiety in the Aromatic Polyol (Wt %)

The amount of the TPA moiety in the aromatic polyol of each of Preparative Examples 1 to 6 was analyzed as follows. First, a predetermined amount of the aromatic polyol was placed in a sample bottle. Then, a predetermined amount of KOH aqueous solution having a predetermined concentration was added into each of the sample bottle (i.e., experimental group) and an empty bottle (i.e., control group without the aromatic polyol). Next, each of the experimental group and the control group was heated to 95° C. and stirred for 3 hours, followed by titrating with 1 N hydrochloric acid aqueous solution. The titration amount of hydrochloric acid for each of the experimental group and the control group was recorded, which was then used to determine the amount of KOH used to react with the aromatic polyol in the experimental group and the amount of KOH in the control group. Subsequently, a saponification value of the aromatic polyol was calculated by subtracting the amount of KOH in the control group from the amount of KOH in the experimental group. A molar amount of the TPA moiety and the weight percentage of the TPA moiety in the aromatic polyol were calculated using the following formulas:

the molar amount of TPA moiety=[saponification value×(1 g/1000 mg)/(56.1×2)];

the weight percentage of TPA moiety=(the molar amount of TPA moiety×molecular weight of TPA moiety (i.e., 166.13)/total weight of the aromatic polyol)×100%.

The results are presented in Table 1 below.

5. Structural Analysis

Figure 1:
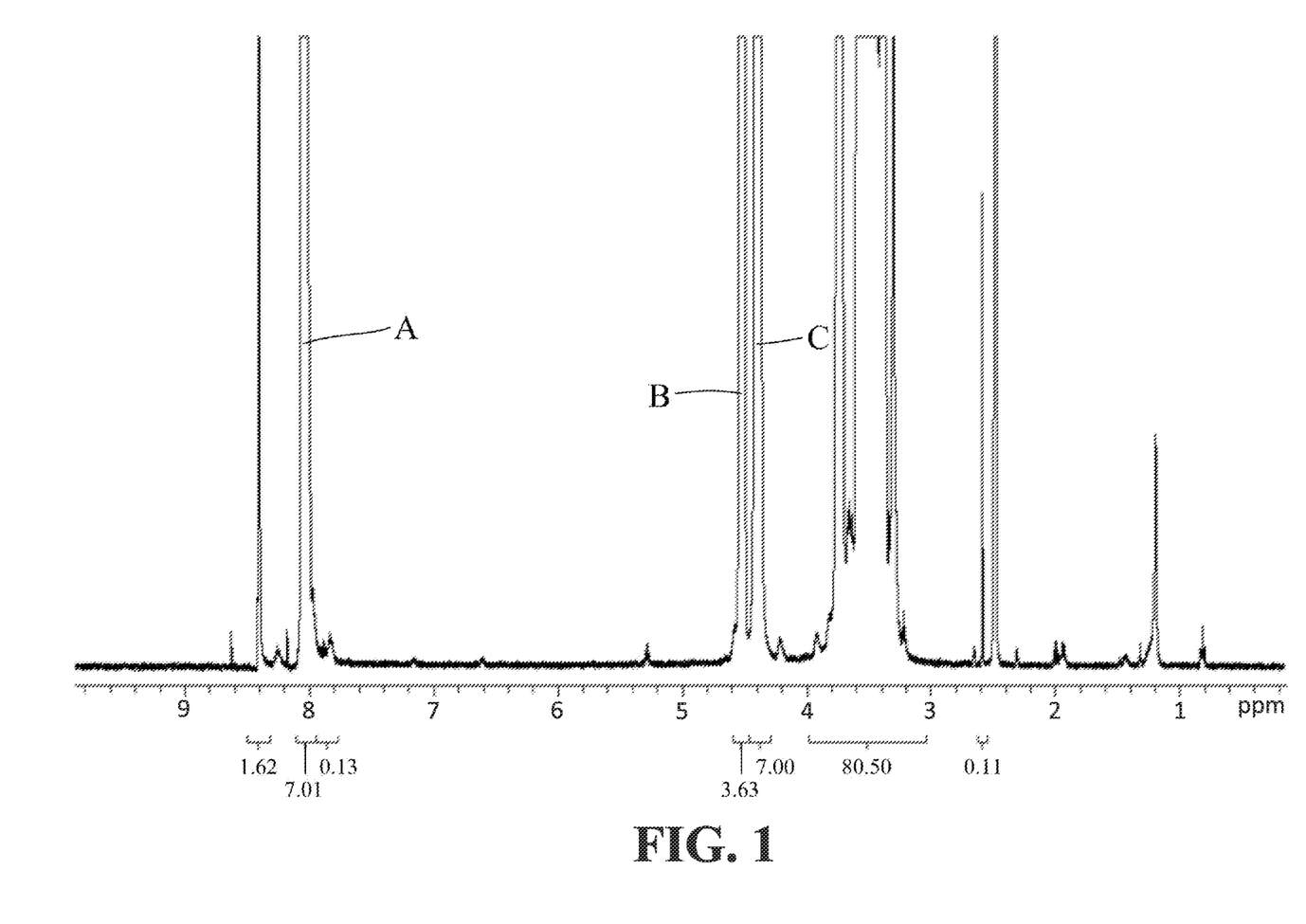
FIG. 1 is a nuclear magnetic resonance (NMR) spectrum illustrating a result of a structural analysis conducted on an aromatic polyol represented by Formula (I) of Preparative Example 3 used in the disclosure.

The aromatic polyol of Preparative Example 3 (PHB10) was analyzed with $^1$H-nuclear magnetic resonance (NMR) spectrometer (solvent: DMSO-$d_6$; frequency: 400 MHz). The resultant spectrum is shown in FIG. 1.

6. Analysis of p and q Values in Formula (I)

The p and q values in the aromatic polyol represented by Formula (I) of each of Preparative Examples 1 to 6 were analyzed using a gel permeation chromatography (GPC) system (Manufacturer: Waters Corporation; Model: waters 1525; equipped with a refractive index detector and an aqueous column, Tsk-gel G2500PWXL). To be specific, the aromatic polyol was first subjected to a saponification reaction by reacting with a predetermined amount of sodium hydroxide aqueous solution at 95° C. under stirring for 3 hours. The resultant reaction product includes polyethylene glycol (PEG) formed from a first ether segment H—(O—$CH_2$—$CH_2$)$_p$—O—$CH_2$—$CH_2$—O— and a second ether segment H—(O—$CH_2$—$CH_2$—)$_q$—O—$CH_2$—$CH_2$—O— of the aromatic polyol by the saponification reaction, which was dissolved in water phase. After filtration with a filter paper and a screen filter, the filtrate containing the PEG was analyzed using the GPC system to estimate approximate p and q values. The results are as presented in Table 1 below.

TABLE 1

|  |  | Preparative Example | | | | | |
| --- | --- | --- | --- | --- | --- | --- | --- |
|  |  | 1 | 2 | 3 | 4 | 5 | 6 |
| Aromatic polyol |  | PHB2.5 | PHB6 | PHB10 | PHB20 | PHB30 | PHB40 |
| Amount of BHET | g | 300 | 300 | 300 | 300 | 300 | 300 |
|  | mol | 1.18 | 1.18 | 1.18 | 1.18 | 1.18 | 1.18 |
| Amount of EO | g | 129.8 | 311.85 | 519.75 | 1039.50 | 1559.25 | 2079.00 |
|  | mol | 2.95 | 7.08 | 11.80 | 23.60 | 35.40 | 47.20 |
|  | Parts by weight | 43.3 | 104.0 | 173.3 | 346.5 | 519.9 | 693.0 |
| Amount of KOH | g | 0.04298 | 0.0612 | 0.08198 | 0.13396 | 0.18594 | 0.2379 |
|  | Concentration (ppm) | 100 | 100 | 100 | 100 | 100 | 100 |
| Evaluations | State of matter | liquid | liquid | liquid | liquid | liquid | solid |
|  | Viscosity at 30° C. (cp) | 1253 | 1115 | 1005 | 1062 | 1093 | N/A |
|  | Molecular weight | 364 | 518 | 694 | 1134 | 1574 | 2014 |
|  | Amount of TPA moiety (wt %) | 45.5 | 32.0 | 24.0 | 14.6 | 11.8 | 8.2 |
|  | First ether segment/ p | 1 or 2 | 3 | 5 | 10 | 15 | 20 |
|  | q | 2 or 1 | 3 | 5 | 10 | 15 | 20 |
|  | Mw | 131 | 200 | 304 | 518 | 754 | 1004 |

TABLE 1-continued

| | | Preparative Example | | | | | |
|---|---|---|---|---|---|---|---|
| | | 1 | 2 | 3 | 4 | 5 | 6 |
| second ether segment | Mn | 116 | 182 | 271 | 488 | 709 | 933 |
| | Polydispersity Index (Mw/Mn) | 1.1292 | 1.0991 | 1.1216 | 1.0583 | 1.0632 | 1.0764 |

N/A stands for "not applicable"

Mw stands for "weight-average molecular weight";

Mn stands for "number-average molecular weight"; and the concentration of KOH = amount of KOH × 1000/[(amount of KOH + amount of EO + amount of BHET)/1000]

Based on the results in Table 1, the aromatic polyols of Preparative Examples 1 to 5 are in liquid state under room temperature, and are thus suitable for dispersing the zinc oxide component.

Referring to FIG. 1, the following observations can be made from the NMR spectrum of PHB10 (i.e., the aromatic polyol of Preparative Example 3). Firstly, the characteristic absorption peak of BHET (4.7 ppm) is not observed, which indicates BHET has been completely reacted with EO. Secondly, three major characteristic absorption peaks A (8 ppm, hydrogen of phenyl groups), B (4.6 ppm, hydrogen of terminal hydroxyl groups), and C [4.4 ppm, hydrogen of —C(O)—O—CH$_2$— group] are observed, and a ratio of the integral peak areas thereof was calculated to be 4:2:4, which matches with a number of hydrogens attached to different structural parts of the aromatic polyol represented by Formula (I). Thirdly, the characteristic absorption peak of terminal hydroxyl groups of BHET (5 ppm) is not observed. Therefore, it can be concluded that hydrogens originally attached to the terminal hydroxyl groups of BHET are separated from the phenyl group by —(O—CH$_2$—CH$_2$)$_p$— or —(CH$_2$—CH$_2$—O)$_q$— groups (i.e., the first and second ether segments of the aromatic polyol). The characteristic absorption peak of these hydrogens shifted to 4.6 ppm, which proves that BHET and EO can react to form the aromatic polyol represented by Formula (I).

Based on the results of GPC analysis, taking PHB10 as an example for detailed explanation, it can be noted that the Mw and Mn values of the first/second ether segment of PHB10 are very close to a theoretical molecular weight (282) of a polyethylene glycol (PEG) segment when p and q values equal to 5. Since the molar ratio of EO to BHET used to prepare PHB10 is 10:1, and EO tends to be evenly distributed to react with the two terminal hydroxyl groups of BHET, after the saponification reaction, the theoretical molecular weight of the first/second ether segment can be estimated to be 282 (=1+5×44+44+17). In addition, the polydispersity index (PDI) of PHB10 is 1.1216 (close to 1), which also indicates that p and q have similar values.

Preparation of Dispersion

Example 1 (EX1)

20.23 g of zinc acetate dihydrate [Zn(OAc)$_2$·2H$_2$O; molecular weight: 219.51; purchased from Lay Shung Co., Ltd.] and 60 mL of deionized water were mixed and heated in an oil bath under a temperature of 80° C. and stirred at a rotation speed of 500 rpm for 15 minutes, so as to obtain a zinc acetate aqueous solution.

Then, 142.5 g of PHB6 of Preparative Example 2 was gradually added into the zinc acetate aqueous solution to form a composition. Thereafter, the composition was placed in an oil bath, which was heated to 120° C. such that a temperature of the composition was kept at 100° C., and the composition was stirred at a rotation speed of 500 rpm for one hour to form a clear mixture having a water content ranging from 0.05 wt % to 1 wt %.

Next, the mixture was heated in an oil bath to 105° C. and stirred at a rotation speed of 500 rpm for one hour to proceed with a hydrolysis reaction, in which acetyl groups of the zinc acetate were transformed into hydroxyl groups, thereby obtaining the zinc intermediate product. Subsequently, the mixture was heated to 135° C. and stirred at a rotation speed of 500 rpm for one hour to proceed with a condensation reaction, in which the zinc intermediate product was transformed into an amorphous zinc oxide component. After cooling to a room temperature, a clear and transparent dispersion which includes the aromatic polyol (PHB6) and 5 wt % of the amorphous zinc oxide component is obtained.

Examples 2 to 21 (EX2 to EX21)

The procedures for preparing the dispersions of EX2 to EX21 were similar to those for preparing the dispersion of EX1, except that the contents of the composition, including the type of the aromatic polyol, and the added amounts of the aromatic polyol, the zinc acetate dihydrate and water, used in each of EX2 to EX21 were varied as shown in Table 2.

Comparative Examples 1 to 3 (CE1 to CE3)

The procedures for preparing the dispersions of CE1 to CE3 were similar to those for preparing the dispersion of EX1, except that PEG400 (Manufacturer: ORIENTAL UNION CHEMICAL CORPORATION(OUCC)), PEG600 (Manufacturer: ORIENTAL UNION CHEMICAL CORPORATION(OUCC)) and PPG450 (Manufacturer: Emperor Chemical Co., Ltd.) were used instead of PHB6 in CE1 to CE3, respectively. In addition, the dispersion of CE2 is in a solid-state.

TABLE 2

| | | Type of aromatic polyol | Composition | | | | | Dispersion | |
|---|---|---|---|---|---|---|---|---|---|
| | | | Amount of aromatic polyol (g) | Amount of zinc acetate dihydrate (g) | (wt %)[1] | Amount of deionized water (g) | Amount of phenyl group (wt %)[2] | Amount of amorphous zinc oxide component (g) | (wt %)[3] |
| EX | 1 | PHB6 | 142.5 | 20.23 | 9.08 | 60 | 13.9 | 7.5 | 5 |
| | 2 | PHB6 | 138 | 32.36 | 12.93 | 80 | 13.5 | 12 | 8 |
| | 3 | PHB6 | 135 | 40.45 | 14.69 | 100 | 13.2 | 15 | 10 |
| | 4 | PHB6 | 127.5 | 60.68 | 18.49 | 140 | 12.5 | 22.5 | 15 |
| | 5 | PHB6 | 120 | 80.90 | 21.24 | 180 | 11.8 | 30 | 20 |
| | 6 | PHB2.5 | 142.5 | 20.23 | 9.08 | 60 | 19.9 | 7.5 | 5 |
| | 7 | PHB2.5 | 135 | 40.45 | 14.69 | 100 | 18.8 | 15 | 10 |
| | 8 | PHB2.5 | 127.5 | 60.68 | 18.49 | 140 | 17.8 | 22.5 | 15 |
| | 9 | PHB2.5 | 120 | 80.90 | 21.24 | 180 | 16.7 | 30 | 20 |
| | 10 | PHB10 | 142.5 | 20.23 | 9.08 | 60 | 10.5 | 7.5 | 5 |
| | 11 | PHB10 | 135 | 40.45 | 14.69 | 100 | 9.9 | 15 | 10 |
| | 12 | PHB10 | 127.5 | 60.68 | 18.49 | 140 | 9.4 | 22.5 | 15 |
| | 13 | PHB20 | 142.5 | 20.23 | 9.08 | 60 | 6.4 | 7.5 | 5 |
| | 14 | PHB20 | 135 | 40.45 | 14.69 | 100 | 6 | 15 | 10 |
| | 15 | PHB20 | 127.5 | 60.68 | 18.49 | 140 | 5.7 | 22.5 | 15 |
| | 16 | PHB30 | 142.5 | 20.23 | 9.08 | 60 | 4.6 | 7.5 | 5 |
| | 17 | PHB30 | 135 | 40.45 | 14.69 | 100 | 4.3 | 15 | 10 |
| | 18 | PHB30 | 127.5 | 60.68 | 18.49 | 140 | 4.1 | 22.5 | 15 |
| | 19 | PHB40 | 142.5 | 20.23 | 9.08 | 60 | 3.6 | 7.5 | 5 |
| | 20 | PHB40 | 135 | 40.45 | 14.69 | 100 | 3.4 | 15 | 10 |
| | 21 | PHB40 | 127.5 | 60.68 | 18.49 | 140 | 3.2 | 22.5 | 15 |
| CE | 1 | PEG400 | 142.5 | 20.23 | 9.08 | 60 | 0 | 7.5 | 5 |
| | 2 | PEG600 | 142.5 | 20.23 | 9.08 | 60 | 0 | 7.5 | 5 |
| | 3 | PPG450 | 142.5 | 20.23 | 9.08 | 60 | 0 | 7.5 | 5 |

Note:
[1] zinc acetate dihydrate (wt %) = [amount of zinc acetate dihydrate/(a total amount of aromatic polyol, zinc acetate dihydrate and deionized water)] × 100%;
[2] amorphous zinc oxide component (wt %) = [(amount of amorphous zinc oxide component/(a total amount of amorphous zinc oxide component and aromatic polyol)] × 100%; and
[3] phenyl group (wt %) = [(76/molecular weight of aromatic polyol) × amount of aromatic polyol × 100%/(the total amount of amorphous zinc oxide component and aromatic polyol).

Evaluations of the Dispersion:

1. Infrared (IR) Spectrometry

Figure 2:
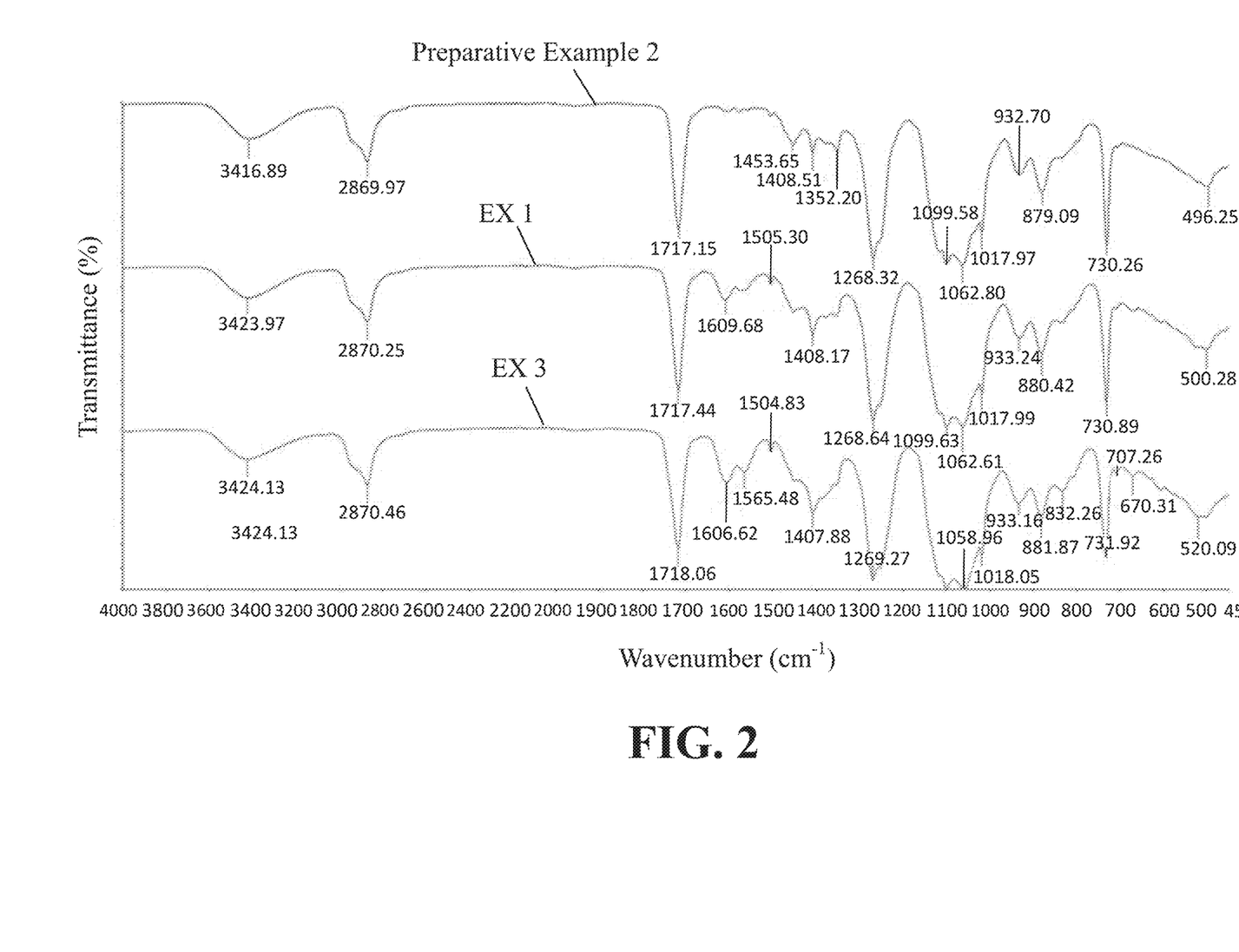
FIGS. 2 and 3 show overlapping infrared (IR) spectra of the aromatic polyol of Preparative Example 2 and dispersions of Examples 1 and 3, illustrating a bonding relationship between a zinc oxide component and the aromatic polyol.
Figure 3:
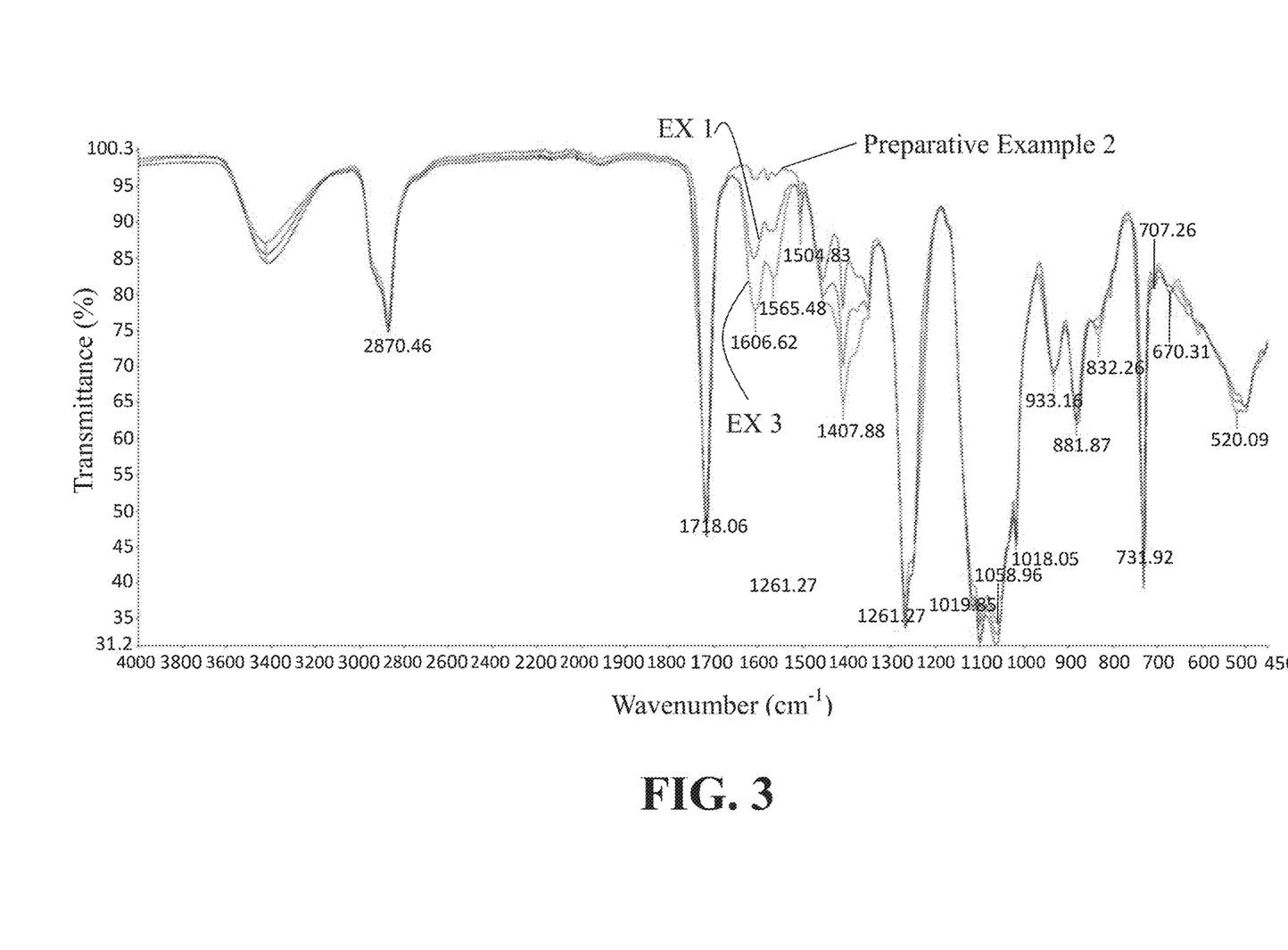

The aromatic polyol of Preparative Example 2 (i.e., PHB6), and the dispersions of EX1 and EX3 were analyzed with a Fourier transform infrared spectrometer (Manufacturer: Perkin Elmer; Model: Spectrum 100). The results are shown in FIGS. 2 and 3.

2. X-Ray Diffraction (XRD) Spectrometry

Figure 4:
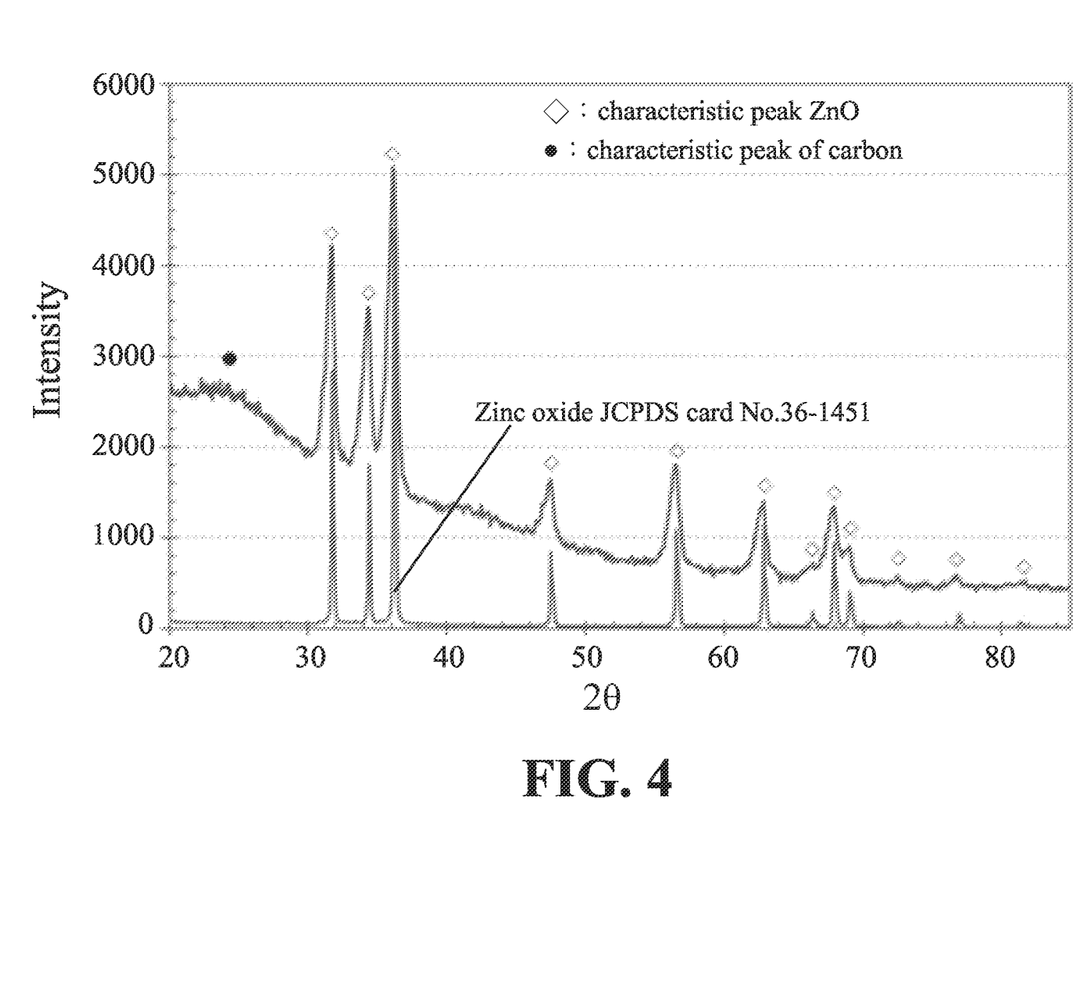
FIG. 4 is an X-Ray diffraction (XRD) spectrum illustrating a structure of the zinc oxide component obtained from the dispersion according to the disclosure.

Ethanol was added into the dispersion of EX3 to form precipitates. After filtration, the resultant filter cake containing the precipitates was dried in an oven at 70° C. Next, the dried filter cake was analyzed using an X-Ray diffractometer (Manufacturer: Bruker; Model: D2 PHASER). The analysis result is shown in FIG. 4. For comparison purpose, a zinc oxide (JCPDS card No. 36-1451) having a hexagonal wurtzite structure was subjected to the same analysis.

Figure 5:
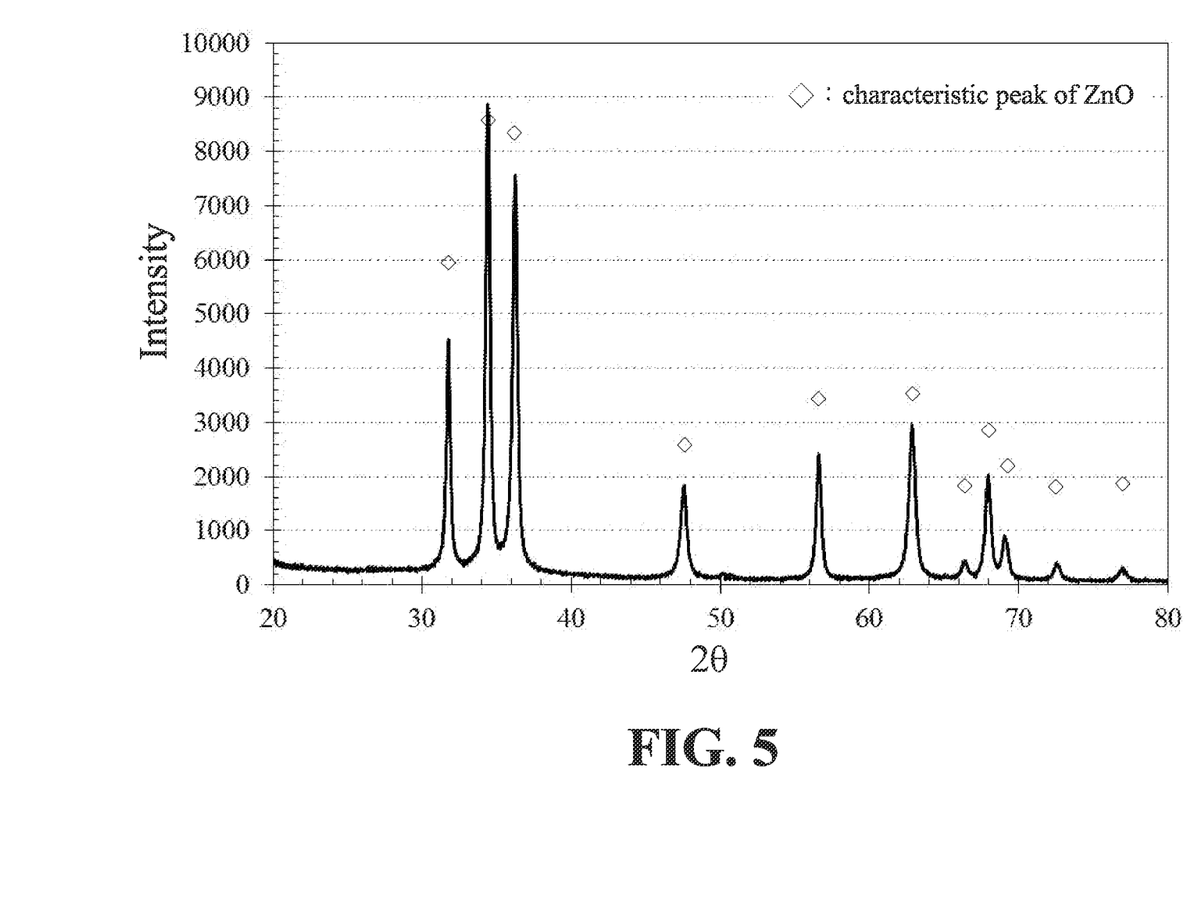
FIG. 5 is an XRD spectrum illustrating a structure of the zinc oxide component after a sintering treatment.

In addition, the dried filter cake of EX3 was sintered at 450° C. for an hour to obtain a sintered product, which was then analyzed using the X-Ray diffractometer. The result is shown in FIG. 5.

3. Fluidity Under Room Temperature

The fluidity of the dispersion of each of EX1 to EX21 and CE1 to CE3 was determined as follows. First, the dispersion was added into an empty container to fill up 80% of the container. Next, the container was sealed and then placed upside-down to check whether or not the dispersion exhibits immediate flow. In the affirmative, the dispersion is deemed to have fluidity.

4. Dispersion Stability Under Room Temperature

The dispersion stability of the dispersion of each of EX1 to EX21 and CE1 to CE3 was determined by keeping the dispersion still under room temperature, and observing the appearance thereof for 180 days. If sedimentation occurred (i.e., formation of layered liquids), the number of days passed since the start of the observation was recorded, and the dispersion is deemed to lack dispersion stability under room temperature.

5. Dispersion Stability Under High Temperature

The dispersion of each of EX 1 to 13, EX16, EX 19, and CE1 to CE3 was placed in an oven with mechanical convection (Manufacturer: CHANNEL; Model: DV-1203) and heated from 30° C. to 120° C. at an increasing rate of 10° C./30 min. During the heating process, observation of the dispersion was performed to determine whether or not sedimentation occurred. In the affirmative, the temperature at which sedimentation occurred was recorded, and the dispersion is deemed to lack dispersion stability under high temperature.

6. Measurement of Sedimentation Speed

The sedimentation speed (μm/s) of the dispersion of each of EX1, EX6, EX10, EX13, EX16, EX19, CE1, and CE3 was measured using a dispersion analyzer (Manufacturer: LUM GmbH; Model: LUMiSizer 651; Lower detection limit: $1 \times 10^{-3}$ μm/s) under a wavelength of light of 870 nm and at a rotation speed of 1000 rpm (i.e., the centripetal acceleration is 135 g, where g is 9.8 m/s$^2$), a rotation time of 10000 seconds, and a temperature of 25° C.

TABLE 3

| | | Dispersion | | | Evaluations | | |
|---|---|---|---|---|---|---|---|
| | Type of aromatic polyol used | Amount of zinc oxide component (wt %) | Amount of phenyl group (wt %) | Fluidity under room temperature | Dispersion stability under room temperature | Dispersion stability under high temperature | Sedimentation speed (μm/s) |
| EX 1 | PHB6 | 5 | 13.9 | Yes | No sedimentation | Slight haze observed at 120° C. | Not measurable* |
| 2 | PHB6 | 8 | 13.5 | Yes | No sedimentation | Slight haze observed at 120° C. | — |
| 3 | PHB6 | 10 | 13.2 | Yes | No sedimentation | Slight haze observed at 120° C. | — |
| 4 | PHB6 | 15 | 12.5 | Yes | No sedimentation | Slight haze observed at 100° C. | — |
| 5 | PHB6 | 20 | 11.8 | Yes | No sedimentation | Slight haze observed at 70° C. | — |
| 6 | PHB2.5 | 5 | 19.9 | Yes | No sedimentation | Slight haze observed at 120° C. | Not measurable* |
| 7 | PHB2.5 | 10 | 18.8 | Yes | No sedimentation | Slight haze observed at 120° C. | — |
| 8 | PHB2.5 | 15 | 17.8 | Yes | No sedimentation | Slight haze observed at 100° C. | — |
| 9 | PHB2.5 | 20 | 16.7 | Yes | No sedimentation | Slight haze observed at 80° C. | — |
| 10 | PHB10 | 5 | 10.5 | Yes | No sedimentation | Slight haze observed at 110° C. | Not measurable* |
| 11 | PHB10 | 10 | 9.9 | Yes | No sedimentation | Slight haze observed at 100° C. | — |
| 12 | PHB10 | 15 | 9.4 | Yes | No sedimentation | Slight haze observed at 80° C. | — |
| 13 | PHB20 | 5 | 6.4 | Yes | No sedimentation | Slight haze observed at 60° C. | Not measurable* |
| 14 | PHB20 | 10 | 6 | Yes | Sedimentation occurs after 120 days | — | — |
| 15 | PHB20 | 15 | 5.7 | Yes | Sedimentation occurs after 90 days | — | — |
| 16 | PHB30 | 5 | 4.6 | Yes | No sedimentation | Slight haze observed at 40° C. | Not measurable* |
| 17 | PHB30 | 10 | 4.3 | Yes | Sedimentation occurs after 45 days | — | — |
| 18 | PHB30 | 15 | 4.1 | Yes | Colloidal liquid | — | — |
| 19 | PHB40 | 5 | 3.6 | Yes | No sedimentation | Slight haze observed at 30° C. | Not measurable* |
| 20 | PHB40 | 10 | 3.4 | Yes | Colloidal liquid | — | — |
| 21 | PHB40 | 15 | 3.2 | Yes | Colloidal liquid | — | — |

TABLE 3-continued

| | | Dispersion | | | Evaluations | | |
|---|---|---|---|---|---|---|---|
| | | Type of aromatic polyol used | Amount of zinc oxide component (wt %) | Amount of phenyl group (wt %) | Fluidity under room temperature | Dispersion stability under room temperature | Dispersion stability under high temperature | Sedimentation speed (μm/s) |
| CE | 1 | PEG400 | 5 | 0 | Yes | Immediate sedimentation | Immediate sedimentation at 30° C. | 3.065 |
| | 2 | PEG600 | 5 | 0 | No | Solid state | Immediate sedimentation at 40° C. | — |
| | 3 | PPG450 | 5 | 0 | Yes | Immediate sedimentation | Immediate sedimentation at 30° C. | 9.056 |

Note:
1) The term "colloidal liquid" refers to a non-transparent colloidal state of the zinc-oxide dispersion right after preparation, which indicates that a portion of the zinc oxide component precipitates out of the dispersion;
2) "—" stands for not determined; and
3) "not measureable" refers to a sedimentation speed lower than a lower detection limit of the dispersion analyzer.

Referring to FIGS. 2 and 3, the peak in a wavenumber range of approximately 3400 cm$^{-1}$ to 3640 cm$^{-1}$ is characteristic of a hydroxyl group, and the peak in a wavenumber range of 520 cm$^{-1}$ to 560 cm$^{-1}$ is characteristic of an O—Zn bond. In addition, the peaks between 1440-1395 cm$^{-1}$ are characteristic of a hydroxyl group from carboxylic acid, contributed by the acetic acid from zinc acetate dihydrate; and the peaks between 1678-1566 cm$^{-1}$ are characteristic of a carbon-carbon double bond from alkene, cyclic alkene, or α,β-unsaturated ketone, contributed by the byproduct of the used aromatic polyol. It can be observed that, as the amount of zinc oxide component increases (i.e., EX3 (10 wt %)>EX1 (5 wt %)>PHB6 (0 wt %)), the signal of the characteristic peak of hydroxyl group decreases while the signal of the characteristic peak of the O—Zn bond increases. This indicates that, when the zinc oxide component is dispersed in PHB6, the zinc atoms of the zinc oxide component form chelating bonds (i.e., O—Zn bonds) with the terminal hydroxyl groups of PHB6, and therefore it facilitates the dispersion of the zinc oxide component in PHB6 even better attributed to the steric effect of the phenyl group of PHB6 that effectively prevents the zinc oxide component to agglomerate and precipitate.

Referring to FIG. 4, it can be observed that the XRD characteristic peaks of the dried filter cake prepared from EX3 (i.e., the upper line) matches with the XRD characteristic peaks of the zinc oxide having a hexagonal wurtzite structure (i.e., the lower line). Since the amorphous zinc oxide in the dried filter cake without the presence of the aromatic polyol tends to be arranged in a manner that requires the lowest energy, it indicates the zinc oxide component formed by the method when preparing the dispersion of this disclosure is amorphous. Referring further to FIG. 5, the XRD characteristic peak of the sintered product obtained by sintering the dried filter cake matches even more with that of the zinc oxide JCPDS card No. 36-1451 shown in FIG. 4. Therefore, it can be concluded that, zinc atoms and oxygen atoms in the zinc oxide component may be arranged more periodically after the sintering process, i.e., XRD characteristic peaks having narrower width as compared to those of the non-sintered filter cake as shown in FIG. 4.

Based on the results in Table 4, it can be observed that, in CE1 and CE3, sedimentation occurred immediately after preparation of the dispersions (i.e., made from PEG400 and PPG450). The dispersion made from PEG600 (i.e., CE2) was in solid-state under room temperature, and sedimentation was immediately observed after the dispersion of CE2 is transformed to liquid-state by heating to 40° C. In comparison, no prepared by using the aromatic polyol represented by Formula (I) of the disclosure. In addition, the dispersion of this disclosure is in liquid-state under room temperature, and therefore additional heating is not necessary before use. These results indicates that since PEG and PPG are long-chain molecules without phenyl groups of the aromatic polyol represented by Formula (I) used in this disclosure, molecules of the zinc oxide component in the dispersions of CE1 to CE3 were not effectively repulsed from one another, and therefore sedimentation and precipitation may easily occur due to collisions between the molecules of the zinc oxide component during Brownian motion. That is, the aromatic polyol represented by Formula (I) is capable of assisting the dispersion of the zinc oxide component, and thus the dispersion of this disclosure exhibits an improved dispersion stability.

Further, the dispersion of this disclosure can maintain a satisfactory dispersion stability even when the zinc oxide component is present in a relatively high amount, e.g., greater than 5 wt %. Moreover, it can be seen from the results of the analysis for dispersion stability under high temperature that, as the amount of phenyl groups increases, the dispersion exhibits better dispersion stability under high temperature (i.e., slight haze can be observed or not when heating), revealing that the zinc oxide component can be well dispersed by the aromatic polyol represented by Formula (I) due to the enhanced steric effect of the phenyl groups even at high temperature.

Furthermore, the sedimentation speed of the dispersions of CE1 and CE3 were 3.065 μm/s and 9.056 μm/s, respectively. In comparison, the sedimentation speed of the dispersions of EX1, EX6, EX10, EX13, EX16, and EX19 were even lower than the lower detection limit of the dispersion analyzer. Therefore, it can be concluded that, compared to the polyol used in the prior art, the dispersion of this disclosure exhibits a better dispersion property, and can maintain a satisfactory dispersibility after a long storage time.

APPLICATION EXAMPLES

Application Example 1 (AE1): Processed Non-Woven Fabric Product 60 g of Spin finish (ester oil combination emulsifier and antistatics, weakly anionic, purchased from World Chem Ind. Co.; Model: ESTESOL 7796) and 40 g of the dispersion of EX11 were evenly mixed. Then, 900 g of water was added to form 1000 g of a mixture, in which the amorphous zinc oxide component is present in an amount of 0.4 wt %. Next, 100 g of non-woven fabric (obtained from Far Eastern New Century Corporation; No. H20190527462) was immersed in the mixture for 1 minute, followed by drying in a washer (Manufacturer: Whirlpool; Model: WM141D) for 1 minute. Finally, the dried non-woven fabric was placed in an oven at 110° C. and baked for 10 minutes to obtain a processed non-woven fabric product. The processed non-woven fabric product includes the non-woven fabric, and the Spin finish and the zinc oxide component having a hexagonal wurtzite structure, which are distributed in the non-woven fabric.

Application Example 2 (AE2): Artificial Leather Product 100 g of a solvent-based one component polyurethane resin (purchased from Evermore Chemical Industry Co. Ltd.; Model No. SS-1054F; solid content: 30 wt %; dissolved in dimethylformamide) and 0.44 g of the dispersion of EX7 were evenly mixed, followed by adding 1 g of a curing agent (purchased from Evermore Chemical Industry Co., Ltd.; No. SC-7190NY) and evenly stirring to obtain a coating material. Then, the coating material was coated on a piece of release paper to form a wet film having a thickness of 30 μm. Next, the wet film was baked in an oven of 150° C. for 10 minutes to remove dimethylformamide, thereby obtaining a layer of artificial leather product on the release paper. The artificial leather product has a thickness of 10 μm, and includes 0.14 wt % of the zinc oxide component having a hexagonal wurtzite structure.

Application Example 3 (AE3): Cleaning Agent 36 g of the aromatic polyol of Preparative Example (serving as a non-ionic surfactant), 8 g of sodium dodecyl benzene sulfonate (serving as an anionic surfactant; purchased from Emperor Chemical Co., Ltd.; CAS: 68584-22-5; concentration: 96%), and 31 g of water were evenly mixed. Then, 25 g of the dispersion of EX6 was added to form 100 g of a cleaning agent, in which the amorphous zinc oxide component is present in an amount of 1.25 wt %.

Comparative Application Example 1 (CAE1): Cleaning Agent

The procedures for preparing the cleaning agent of CAE1 are similar to those for preparing the cleaning agent of AE3, except that in CAE1, the dispersion of CE1 was used instead of the dispersion of EX6.

Comparative Application Example 2 (CAE2): Cleaning Agent

The procedures for preparing the cleaning agent of CAE2 are similar to those for preparing the cleaning agent of AE3, except that in CAE2, the dispersion of CE3 was used instead of the dispersion of EX6.
Evaluations:
1. Antimicrobial Test
Each of the processed non-woven fabric product of AE1 and the artificial leather product of AE2 was subjected to an antimicrobial test according to the test method defined in FTTS-FA-001 "Specified Requirements of Antibacterial Textiles for General Use".

The results show that, the processed non-woven fabric product of AE 1 exhibits sterilization effect on *Staphylococcus aureus* (sterilizing rate is 88.8%) and *Klebsiella pneumonia* (sterilizing rate is 85.9%). Similarly, the artificial leather product of AE2 also has sterilization effect on *Staphylococcus aureus* and *Klebsiella pneumoniae*. Therefore, it can be concluded that the processed non-woven fabric and the artificial leather manufactured from the dispersion of this disclosure exhibit satisfactory antimicrobial properties.

2. Dispersion Stability Test

The sedimentation speed (μm/s) of the cleaning agent of each of AE3, CAE1 and CAE2 was analyzed using the dispersion analyzer (manufactured by LUM GmbH; Model: LUMiSizer 651) under a light wavelength of 870 nm and at a rotation speed of 1000 rpm (i.e., the centripetal acceleration is 135 g, where g is 9.8 m/s$^2$), a rotation time of 10000 seconds, and a temperature of 25° C.

The measured sedimentation speed of the cleaning agent of each of AE3, CAE1, and CAE2 was 2.715 μm/s, 29.79 μm/s, and 156.1 μm/s, respectively. Based on the results, it can be concluded that, the cleaning agent of AE3 exhibits a better dispersion stability as compared to the cleaning agents of CAE1 and CAE2. Therefore, the cleaning agent of AE3 made from the dispersion of this disclosure may provide more convenience at use and may maintain a good dispersion stability after a long period of storage.

In sum, by virtue of the aromatic polyol represented by Formula (I) having terminal hydroxyl groups to form chelating bonds with zinc atoms of the zinc oxide component and having a phenyl group to repulse the molecules of the zinc oxide component due to steric effect, the dispersion of the disclosure can have an improved dispersion stability with reduced agglomeration and precipitation of the zinc oxide component.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A dispersion, comprising:
an amorphous zinc oxide component; and
an aromatic polyol which is represented by Formula (I), and which has terminal hydroxyl groups that form chelating bonds with zinc atoms of said amorphous zinc oxide component, (I)

wherein p and q are independently integers ranging from 3 to 40.

2. The dispersion according to claim 1, wherein p and q in Formula (I) are independently integers ranging from 3 to 30.

3. The dispersion according to claim 1, wherein said amorphous zinc oxide component is present in an amount that ranges from 1 wt % to 30 wt % based on a total weight of said dispersion.

4. The dispersion according to claim 3, wherein said amorphous zinc oxide component is present in an amount that ranges from 1 wt % to 20 wt % based on the total weight of said dispersion.

5. The dispersion according to claim 1, which is prepared by heating a composition including the aromatic polyol represented by Formula (I) and a zinc-containing salt, wherein said zinc-containing salt undergoes a nucleophilic reaction to form a zinc intermediate product including one of a zinc-containing hydroxide and a zinc-containing alkoxide, and then said zinc intermediate product undergoes a condensation reaction to form said amorphous zinc oxide component.

6. The dispersion according to claim 5, wherein said zinc-containing salt is selected from the group consisting of an acidic zinc salt, a zinc alkoxide, zinc chloride, zinc acetylacetonate, a zinc alkylate, a sulfur-containing zinc salt, and combinations thereof.

7. The dispersion according to claim 5, wherein the nucleophilic reaction is implemented at a first temperature, and the condensation reaction is implemented at a second temperature that is higher than the first temperature.

8. The dispersion according to claim 7, wherein the first temperature is higher than 100° C. and less than 130° C., and the second temperature ranges from 130° C. to 150° C.

9. The dispersion according to claim 5, wherein said composition further includes water.

10. A method for preparing a dispersion, comprising the steps of:
heating a composition including a zinc-containing salt, and an aromatic polyol which is represented by Formula (I) and which has terminal hydroxyl groups, so that the zinc-containing salt undergoes a nucleophilic reaction to form a zinc intermediate product including one of a zinc-containing hydroxide and a zinc-containing alkoxide, and then the zinc intermediate product undergoes a condensation reaction to form an amorphous zinc oxide component, and the terminal hydroxyl groups of the aromatic polyol form chelating bonds with zinc atoms of the amorphous zinc oxide component, thereby obtaining the dispersion, (I)

wherein p and q are independently integers ranging from 3 to 40.

11. The method according to claim 10, wherein the zinc-containing salt is selected from the group consisting of an acidic zinc salt, a zinc alkoxide, zinc chloride, zinc acetylacetonate, a zinc alkylate, a sulfur-containing zinc salt, and combinations thereof.

12. The method according to claim 10, wherein the nucleophilic reaction is implemented at a first temperature and the condensation reaction is implemented at a second temperature higher than the first temperature.

13. The method according to claim 12, wherein the first temperature is higher than 100° C. and less than 130° C., and the second temperature ranges from 130° C. to 150° C.

14. The method according to claim 10, wherein the composition further includes water.

15. The method according to claim 10, wherein the amorphous zinc oxide component is present in an amount that ranges from 1 wt % to 30 wt % based on a total weight of the dispersion.

16. The method according to claim 15, wherein the amorphous zinc oxide component is present in an amount that ranges from 1 wt % to 20 wt % based on the total weight of the dispersion.

17. A composition for preparing a dispersion, comprising:
a zinc-containing salt which is capable of forming a zinc intermediate product including one of a zinc-containing hydroxide and a zinc-containing alkoxide through a nucleophilic reaction, and forming an amorphous zinc oxide component through a condensation reaction of said zinc intermediate product under heating; and
an aromatic polyol which is represented by Formula (I), and which has terminal hydroxyl groups adapted for forming chelating bonds with zinc atoms of said amorphous zinc oxide component, (I)

end
wherein p and q are independently integers ranging from 3 to 40.

18. The composition according to claim 17, wherein p and q in Formula (I) are independently integers ranging from 3 to 30.

19. The composition according to claim 17, wherein said zinc-containing salt is selected from the group consisting of an acidic zinc salt, a zinc alkoxide, zinc chloride, zinc acetylacetonate, a zinc alkylate, a sulfur-containing zinc salt, and combinations thereof.

20. The composition according to claim 17, further comprising water.

* * * * *

UNITED STATES PATENT AND TRADEMARK OFFICE
CERTIFICATE OF CORRECTION

| | | |
|---|---|---|
| PATENT NO. | : 11,849,723 B2 | Page 1 of 1 |
| APPLICATION NO. | : 17/147300 | |
| DATED | : December 26, 2023 | |
| INVENTOR(S) | : Ting et al. | |

It is certified that error appears in the above-identified patent and that said Letters Patent is hereby corrected as shown below:

In the Claims

| Column | Line | |
|---|---|---|
| 20 | 60-61 | change "end wherein" to -- and wherein -- |

Signed and Sealed this
Third Day of February, 2026

John A. Squires
*Director of the United States Patent and Trademark Office*